United States Patent Office.

R. D'HEUREUSE, OF NEW YORK, N. Y.

IMPROVED MODE OF PRESERVING LIQUID AND OTHER SUBSTANCES.

Specification forming part of Letters Patent No. 93,182, dated August 3, 1869.

*To all whom it may concern:*

Be it known that I, R. D'HEUREUSE, of the city, county, and State of New York, have invented a new and Improved Mode of Preserving and Conserving Fruit, Produce, &c.; and I do hereby declare that the following is a full, clear, and exact description thereof, which will enable others skilled in the art to make and use the same.

This invention relates, principally, to improved means for conserving, by purification of their organic substances, aqueous or oleaginous fluids or semi-fluids that contain nitrogen, against putrefaction, mold, decay, or otherwise improve them. This result is obtained by means of artificial currents of air through the same, when the nitrogenous parts are speedily oxidized, thereby become innocuous, and leave the purified liquid or semi-liquid substance in an improved state of preservation. To restore or keep fluid as well as solid substances where rot or putrefaction has already acted or is imminent, sulphurous vapors or other gases should be employed in connection with the air. The temperature of the air employed in the manner aforesaid should in no case be below the freezing-point of the liquid, for at that state the desired action of the oxygen on the then inaccessible nitrogenous parts of the substance under treatment would be prevented. Common water in cisterns, reservoirs, or other receptacles is principally in the warm season of the year, contaminated by organic substances taken from the soil through which it passes, or from the air above, and these organic substances putrefying are the fruitful cause of numerous diseases, by which annually thousands of valuable lives are lost. The albuminous or nitrogenous parts in oleaginous or saccharine fruit-juices, sirups, or spirits form the principal part of the impurities which cause deterioration or unpleasant taste, and are as yet only removed by expensive and complicated means. In all these cases the action of the oxygen of the air impelled through said substances perfectly purifies and preserves them by the oxidation of the nitrogenous parts.

To enable others skilled in the art to make and use my invention, I shall proceed to describe the same.

Air of proper temperature is conducted by pipe, hose, or other conveyance from the blowing apparatus to or near the bottom of the vessel in which the fluid or semi-fluid is contained, or the air in connection with the sulphurous vapors or other gases to the bottom of the solids to be treated by it, so that the air rises through the said fluids, &c., and may be brought in intimate and uniform contact with every part thereof, thereby, in one case, to exert the oxidizing action; in the other, in connection with other gases, to prevent or arrest putrefaction and decay.

I do not claim the employment of artificial currents of air previously cooled or dried, or otherwise voided, by chemical or mechanical means of some of its constituents for drying, and by the prevention of an oxidation preserving grain, fruit, and other "solid" organic substances, as this has been used and patented by other parties; but What I do claim, and desire to secure by Letters Patent, is—

1. The mode of preserving and improving fluid or semi-fluid organic substances by impelling air from below through the same, and thus inducing an oxidation of the nitrogenous parts.

2. The mode of arresting or preventing putrefaction or decay in fluid or solid organic substance by artificial currents of air in connection with sulphurous vapors or other gases through said substances from below, substantially as hereinbefore described and set forth.

The above specification of my invention signed by me this 27th day of April, 1869.

R. D'HEUREUSE.

Witnesses:
FRANK BLOCKLEY,
ALEX. F. ROBERTS.